(12) United States Patent
Jang et al.

(10) Patent No.: US 9,331,530 B2
(45) Date of Patent: May 3, 2016

(54) LAMINATED CORE OF MOTOR HAVING STRUCTURE SUITABLE FOR INSULATION COATING

(71) Applicant: NEW MOTECH CO., LTD., Gwangju (KR)

(72) Inventors: Jeong Cheol Jang, Gwangju (KR); Kyoung Joo Lee, Gwangju (KR); Hyun Sung Yang, Gwangju (KR)

(73) Assignee: NEW MOTECH CO., LTD., Gwangju (KR)

( * ) Notice: Subject to any disclaimer, the term of this patent is extended or adjusted under 35 U.S.C. 154(b) by 0 days.

(21) Appl. No.: 14/324,261

(22) Filed: Jul. 7, 2014

(65) Prior Publication Data

US 2015/0084476 A1 Mar. 26, 2015

(30) Foreign Application Priority Data

Sep. 23, 2013 (KR) ........................ 10-2013-0112397

(51) Int. Cl.
*H02K 1/14* (2006.01)
(52) U.S. Cl.
CPC ..................................... *H02K 1/146* (2013.01)
(58) Field of Classification Search
CPC ....................................................... H02K 1/246
USPC ................... 310/216.111, 216.043, 216.048,
310/216.044, 216.017, 216.019, 216.052,
310/216.059, 216.097, 216.018, 216.031,
310/216.025
See application file for complete search history.

(56) References Cited

U.S. PATENT DOCUMENTS

| | | | | |
|---|---|---|---|---|
| 399,213 | A | * | 3/1889 | Robertson ...................... 310/265 |
| 4,047,062 | A | * | 9/1977 | Ludin et al. ............ 310/216.019 |
| 4,374,337 | A | * | 2/1983 | Kohzai et al. .................. 310/186 |
| 4,591,751 | A | * | 5/1986 | Ono .............................. 310/269 |
| 5,477,096 | A | | 12/1995 | Sakashita et al. |
| 5,829,120 | A | * | 11/1998 | Uchida et al. ................... 29/598 |
| 6,157,109 | A | * | 12/2000 | Schiferl et al. .......... 310/216.019 |
| 6,191,510 | B1 | * | 2/2001 | Landin et al. .................... 310/51 |
| 7,143,503 | B2 | * | 12/2006 | Ionel ..................... H02K 1/2733 29/596 |
| 7,221,068 | B2 | | 5/2007 | Yoshimura et al. |
| 2004/0124733 | A1 | * | 7/2004 | Yamamoto ............. B29C 70/72 310/216.044 |
| 2006/0022549 | A1 | * | 2/2006 | Otsuji .................... H02K 3/522 310/216.001 |
| 2007/0035199 | A1 | * | 2/2007 | Yamamoto et al. ........... 310/269 |
| 2009/0026873 | A1 | * | 1/2009 | Matsuo et al. ................. 310/216 |
| 2009/0174280 | A1 | * | 7/2009 | Prudham ................ 310/216.022 |
| 2009/0230812 | A1 | * | 9/2009 | Cho ........................ H02K 1/187 310/216.118 |
| 2011/0140566 | A1 | * | 6/2011 | Nakahara et al. ...... 310/216.018 |
| 2011/0169369 | A1 | * | 7/2011 | Liang et al. ............ 310/216.092 |
| 2012/0112599 | A1 | * | 5/2012 | Park ...................... H02K 1/146 310/216.009 |

FOREIGN PATENT DOCUMENTS

| | | |
|---|---|---|
| JP | 09-285078 A | 10/1997 |
| JP | 2004-248440 A | 9/2004 |
| KR | 10-1994-0003141 A | 2/1994 |
| KR | 10-2004-0085784 A | 10/2004 |
| KR | 10-2006-0016956 A | 2/2006 |
| KR | 10-0629869 B1 | 9/2006 |
| KR | 10-1137606 B1 | 4/2012 |
| KR | 10-1188073 B1 | 10/2012 |
| KR | 10-1228453 B1 | 1/2013 |
| KR | 10-2013-0019136 A | 2/2013 |

* cited by examiner

*Primary Examiner* — Naishadh Desai
(74) *Attorney, Agent, or Firm* — Revolution IP, PLLC

(57) ABSTRACT

Disclosed herein is a laminated core of a motor including: a first core sheet including a first rounded core base, a plurality of first teeth which are radially formed on the first core base, and first tooth ears formed at the end of each of the first teeth; and a second core sheet including a second rounded core base, a plurality of second teeth which are radially formed on the second core base, and second tooth ears formed at the end of each of the second teeth, the second core sheet having the same shape as the first core sheet but being smaller than the first core sheet, wherein the second core sheet is located at the lowermost part, one or more the first core sheets are laminated on the second core sheet, and another second core sheet is located at the uppermost part.

8 Claims, 7 Drawing Sheets

LAMINATED CORE OF MOTOR HAVING STRUCTURE SUITABLE FOR INSULATION COATING

CROSS REFERENCE TO PRIOR APPLICATIONS

This application claims priority under 35 U.S.C. §119 to Korean Patent Application No. KR 10-2013-0112397 filed on Sep. 23, 2013, which is hereby incorporated by reference in its entirety.

BACKGROUND OF THE INVENTION

1. Field of the Invention

The present invention relates to a core of a motor. More particularly, the present invention relates to a laminated core of a motor having a structure which promotes insulation coating on the surface of the laminated core manufactured by laminating thin steel sheets.

2. Background Art

In general, a core used for a stator of a motor has a plurality of teeth formed radially on the inner circumferential surface or the outer circumferential surface of a rounded base core. A coil is wound on each of the teeth, and a contact portion between the coil and the teeth must be insulated electrically.

Various methods for such an electrical insulation have been proposed, and there is a representative method for connecting an insulator which is made with a plastic injection molded article to the upper part and the lower part of a laminated core and winding a coil on a teeth part.

As another method, Korean Patent Laid-open No. 10-1994-0003141 and Japanese Patent Laid-open No. 09-285078 disclose technology for coating the surface of the laminated core with insulating powder to insulate the surface of the core. However, in case that insulating powder or other insulating material is coated on the laminated core, there is a problem in that the insulating material is not uniformly coated on the teeth of the laminated core or at the edge of the inner circumferential surface but is massed in a lump or the coated material is peeled when the coil is wound on the laminated core.

In the meantime, in case of using an insulating plastic insulator, because the width of the insulator which covers tooth ears, namely, teeth end portions is larger than the width of the teeth end portions of the core even though a coil is wounded on the teeth, the wound coil is not separated from the teeth end portions. However, in case that a coil is wound on the teeth portions of the laminated coil which is insulating-coated, because the width of the tooth ears is not secured, the wound coil protrudes out of the tooth ears and gets in contact with a rotor inside the stator, and hence, it causes malfunction of a motor due to generation of withstand voltage.

In order to solve the above problems, the inventors of the present invention propose a laminated core for a motor having a new structure.

SUMMARY OF THE INVENTION

Accordingly, the present invention has been made to solve the above-mentioned problems occurring in the prior arts, and it is an object of the present invention to provide a laminated core of a motor having a structure suitable for insulation coating.

It is another object of the present invention to provide a laminated core of a motor which can prevent a coil from protruding out of teeth when the coil is wound.

The above and other objects, features and advantages of the present invention will be apparent from the following detailed description of the preferred embodiments of the invention in conjunction with the accompanying drawings.

To accomplish the above object, according to an aspect of the present invention, there is provided a laminated coil of a motor including: a first core sheet including a first rounded core base, a plurality of first teeth which are radially formed on the first core base, and first tooth ears formed at the end of each of the first teeth; and a second core sheet including a second rounded core base, a plurality of second teeth which are radially formed on the second core base, and second tooth ears formed at the end of each of the second teeth, the second core sheet having the same shape as the first core sheet but being smaller than the first core sheet, wherein the second core sheet is located at the lowermost part, one or more the first core sheets are laminated on the second core sheet, and another second core sheet is located at the uppermost part.

According to another aspect of the present invention, there is provided a laminated coil of a motor including: a first core sheet including a first rounded core base, a plurality of first teeth which are radially formed on the first core base, and first tooth ears formed at the end of each of the first teeth; and a second core sheet including a second rounded core base, a plurality of second teeth which are radially formed on the second core base, and second tooth ears formed at the end of each of the second teeth, the second core sheet having the same shape as the first core sheet but being smaller than the first core sheet, wherein the first core sheets and the second core sheets are repeatedly put on top of each other by turns and one by one.

In the present invention, an insulating material is coated on the surface of the laminated core.

Moreover, a first tooth curved portion is formed at a portion where the first core base and the first tooth are connected with each other, and a second tooth curved portion is formed at a portion where the second core base and the second tooth are connected with each other.

Furthermore, a first tooth ear curved portion is formed at a portion where the first tooth and the first tooth ear are connected with each other, and a second tooth ear curved portion is formed at a portion where the second tooth and the second tooth ear are connected with each other.

Additionally, one or more inner grooves are formed in the inner face of the second core base and one or more outer grooves are formed in the outer face of the second core base.

In addition, the width of the first tooth ear is 1.1 times to 1.7 times larger than the width of the first tooth.

The laminated core of a motor according to an embodiment of the present invention has a structure suitable for insulation coating, and can prevent a coil from protruding out of teeth when the coil is wound.

BRIEF DESCRIPTION OF THE DRAWINGS

The above and other objects, features and advantages of the present invention will be apparent from the following detailed description of the preferred embodiments of the invention in conjunction with the accompanying drawings, in which.

DETAILED DESCRIPTION OF THE PREFERRED EMBODIMENT

Reference will be now made in detail to the preferred embodiments of the present invention with reference to the attached drawings.

Figure 1:
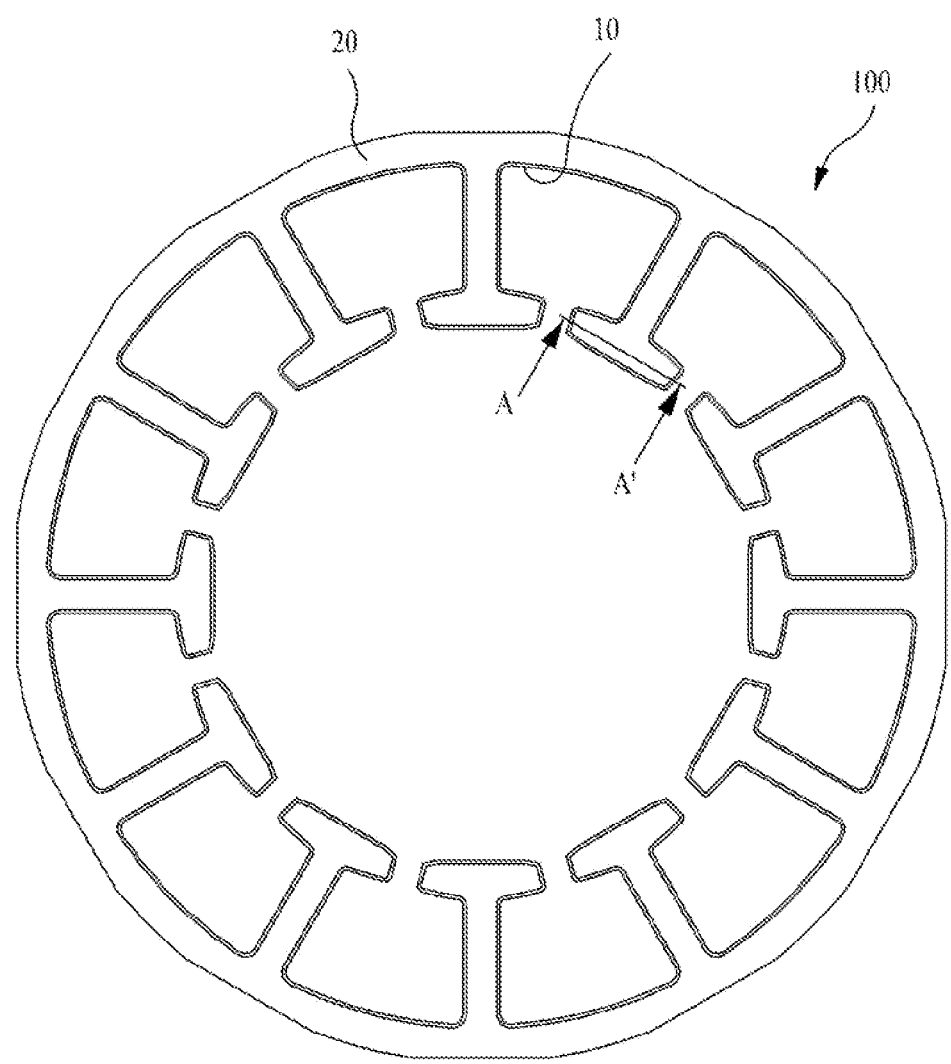
FIG. 1 is a plan view showing a laminated core of a motor according to a first preferred embodiment of the present invention.
Figure 2:
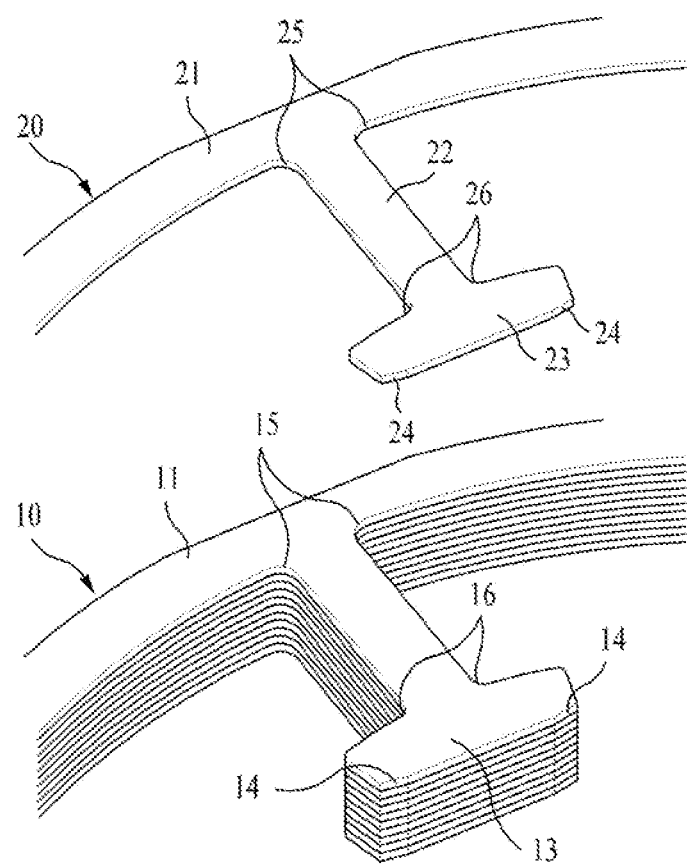
FIG. 2 is a partially enlarged perspective view of the laminated core of a motor according to a first preferred embodiment of the present invention.
Figure 2:
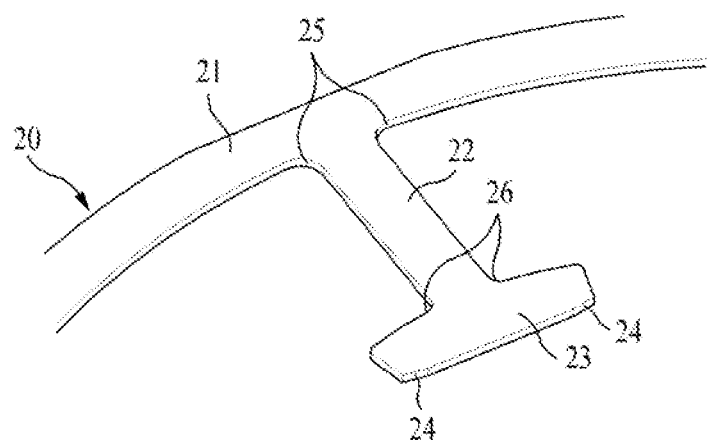
Figure 3:
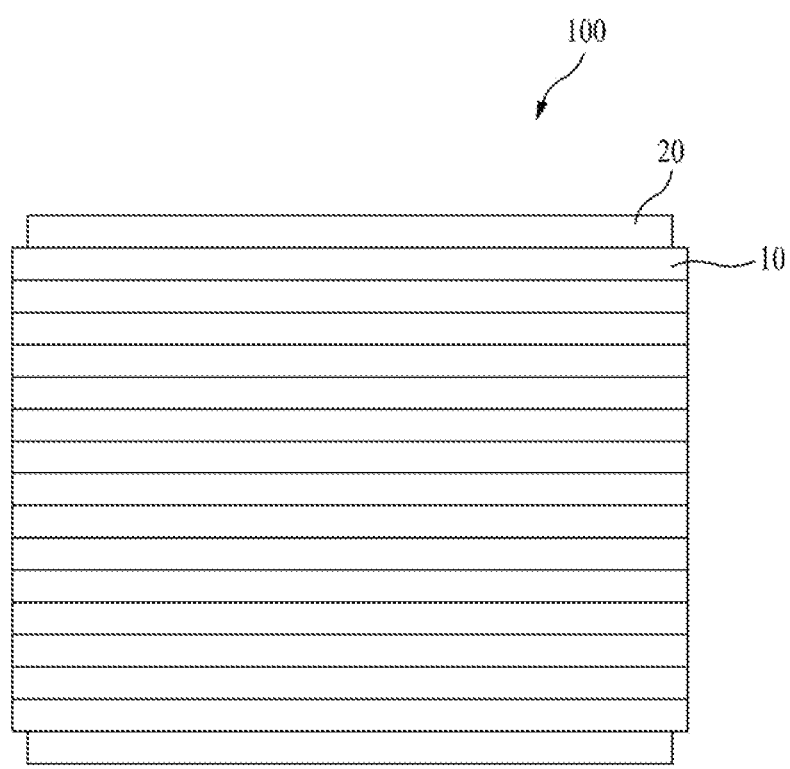
FIG. 3 is a cross sectional view taken along the line of A-A' of FIG. 1 showing the laminated core of the motor according to the first preferred embodiment of the present invention.

FIG. 1 is a plan view showing a laminated core of a motor according to a first preferred embodiment of the present invention, FIG. 2 is a partially enlarged perspective view of the laminated core of a motor according to a first preferred embodiment of the present invention, and FIG. 3 is a cross sectional view taken along the line of A-A' of FIG. 1 showing the laminated core of the motor according to the first preferred embodiment of the present invention.

As shown in FIGS. 1 to 3, the laminated core 100 according to the first preferred embodiment of the present invention includes second core sheets 20 which are laminated on the uppermost first core sheet 10 and the lowermost first core sheet 10 in a state where a plurality of first core sheets 10 are laminated. That is, when viewed from the bottom, the plural first core sheets 10 are laminated on one second core sheet 20, and then, another second core sheet 20 is laminated on the first core sheets 10.

Each of the first core sheets 10 includes a plurality of first teeth 12 which are formed radially on a rounded first core base 11, and first tooth ears 13 which are respectively formed at both sides of the end of each of the first teeth 12 in the circumferential direction.

In the first preferred embodiment, the first core sheet 10 is formed by blanking a generally used core material into a thin film sheet like an electrical steel sheet, and you can see the plane form from FIG. 1. In the meantime, it is preferable that a plurality of the first core sheets 10 be laminated, but it is also good to use at least one first core sheet 10. That is, if the first core sheet 10 is thick, the number of the first core sheets 10 may be reduced. In some cases, just one first core sheet 10 which has the same thickness as 10 to 30 first core sheets 10 may be used.

The first teeth 12 protrude from a first core base 11 in such a way as to face the center of the first core sheets 10 which are arranged to form a circle as shown in FIG. 1, or on the contrary, in such a way as to face the outside of the circle. The protruding direction of the first teeth 12 are determined by a structure of the motor. That is, in case of a motor of an inner rotor type that a rotor (not shown) is located and rotated inside a stator, the first teeth 11 are formed to face the center of the circle, but in case of a motor of an outer rotor type that the rotor is located and rotated outside the stator, the first teeth 11 are formed to face the outside of the circle. The present invention will be described based on the inner rotor type, but may be also applied to the outer rotor type.

The first tooth ears 13 are respectively formed at both sides of the end of each of the first teeth 12 in the circumferential direction. In this embodiment of the present invention, a width ($W_2$) of the first tooth ear 13 is larger than a width ($W_1$) of the first tooth 12. Preferably, the width ($W_2$) of the first tooth ear 13 is 1.1 times to 1.7 times larger than the width ($W_1$) of the first tooth 12. In case of a general laminated core, the width ($W_2$) of the first tooth ear 13 is identical to or smaller than the width ($W_1$) of the first tooth 12. In this embodiment of the present invention, the width ($W_1$) of the first tooth 12 means the width of a straight line section excluding a curved line part which is a connection part between the first core base 11 and the first teeth 12, and the width ($W_2$) of the first tooth ear 13 means the width or the average of the remaining part excluding a curved portion where the first tooth 12 and the first tooth ears (13) are connected.

As described above, when the width of the first tooth ears (13) is increased, the coil wound on the first teeth 12 protrudes inwardly from the first tooth ears 13 so as to prevent that the coil gets in contact with the rotor. A first shaved portion 14 which is formed at the surface of the end of the first tooth ear 13 can prevent cogging torque which may be generated by an increase of the width of the first tooth ear 13. The first shaved portion 14 is formed by chamfering of the end portion of the first tooth ear 13 in order to prevent cogging torque which may be caused by the increased width of the first tooth ear 13.

A first tooth curved portion 15 is a curved portion formed at an area where the first core base 11 and the first tooth 12 are connected with each other. If the area is formed in a straight line, because the insulating material is massed in a lump or is not uniformly coated on the connected portion which is angled, it is good to form the area into a gently curved shape.

The laminated core 100 according to the first preferred embodiment of the present invention is characterized in that one or more the first core sheet 10 are put on top of each other and the second core sheets 20 are laminated on the upper part and the lower part of the first core sheets 10.

Referring to FIG. 3, the second core sheet 20 has the same shape as the first core sheet 10, but is a little smaller than the first core sheet 10. When the second core sheet 20 is laminated on the first core sheet 10, a stepped portion is formed due to a difference in sizes. As described above, the stepped portion is formed when the second core sheets 20 which are a little smaller than the first core sheets 10 are laminated on the first core sheets 10, and it can prevent a lump or ununiform coating of the insulating material which may occur at the edge or peeling of the insulating material which may occur when the coil is wound.

Because the second core sheet 20 is smaller than the first core sheet 10 but has the same shape as the first core sheet 10, the second core sheet 20 includes a second core base 21, second teeth 22, second tooth ears 23, second shaved portions 24, second tooth curved portions 25 and second tooth ear curved portions 26 which respectively correspond to the first core base 11, the first teeth 12, the first tooth ears 13, the first shaved portions 14, the first teeth curved portions 15 and the first tooth ear curved portions 16 of the first core sheet 10. Description of each of the parts will be omitted because they are the same as the parts of the first core sheet 10. Preferably, the first core sheet 10 is a little larger than the second core sheet 10, but the outer circumference of the first core base 11 of the first core sheet 10 is equal to the outer circumference of the second core base 22 of the second core sheet 20. That is, the outer circumference of the first core base 11 of the first core sheet 10 and the outer circumference of the second core base 22 of the second core sheet 20 have the same size but the remaining parts of the first core sheet 10 and the second core sheet 20 are a little different in size, and hence, there are stepped portions between the first core sheet 10 and the second core sheet 20.

In FIGS. 1 to 3, just one second core sheet 20 is located at the lowermost part and just one second core sheet 20 is located at the uppermost part, but if necessary, two or more second core sheets 20 may be located at the lowermost part and the uppermost part.

Figure 4:
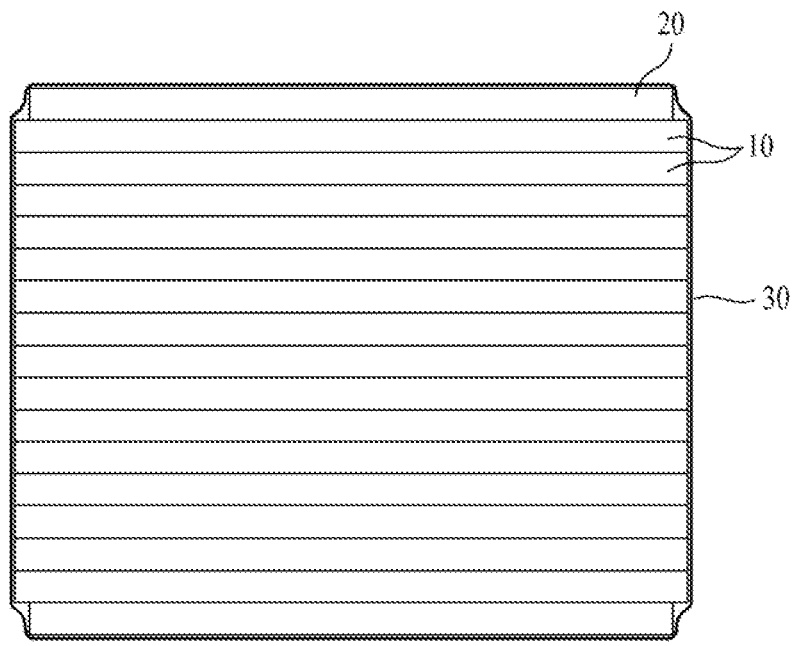
FIG. 4 is a sectional view showing a state where an insulating material is coated on the laminated core of the motor according to the first preferred embodiment of the present invention.

FIG. 4 is a sectional view showing a state where an insulating material is coated on the laminated core of the motor according to the first preferred embodiment of the present invention.

As shown in FIG. 4, the insulating material 30 is coated on the surface of the laminated core 100 according to the preferred embodiment of the present invention. It is preferable that the insulating material 30 is an epoxy-coated material formed by spray coating, but it is not restricted to the above and any material of a liquid phase or a gas phase can be used if the material has the insulation function and can be coated or deposited on the surface of the laminated core 100. As shown in FIG. 4, the stepped portion formed by the difference in size between the first core sheet 10 and the second core sheet 20 at the edge of the laminated core 100 prevents that the insulating material 20 is massed in a lump or is coated ununiformly.

Figure 5:
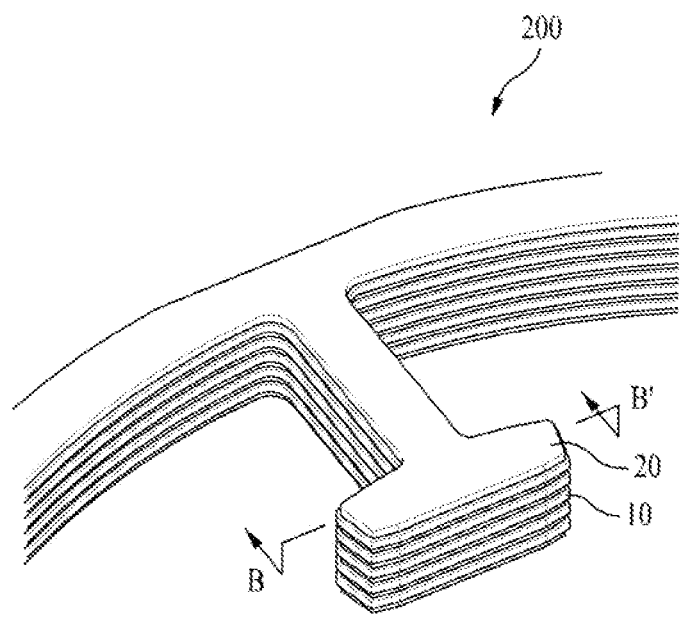
FIG. 5 is a partially enlarged perspective view of the laminated core of a motor according to a second preferred embodiment of the present invention.
Figure 6:
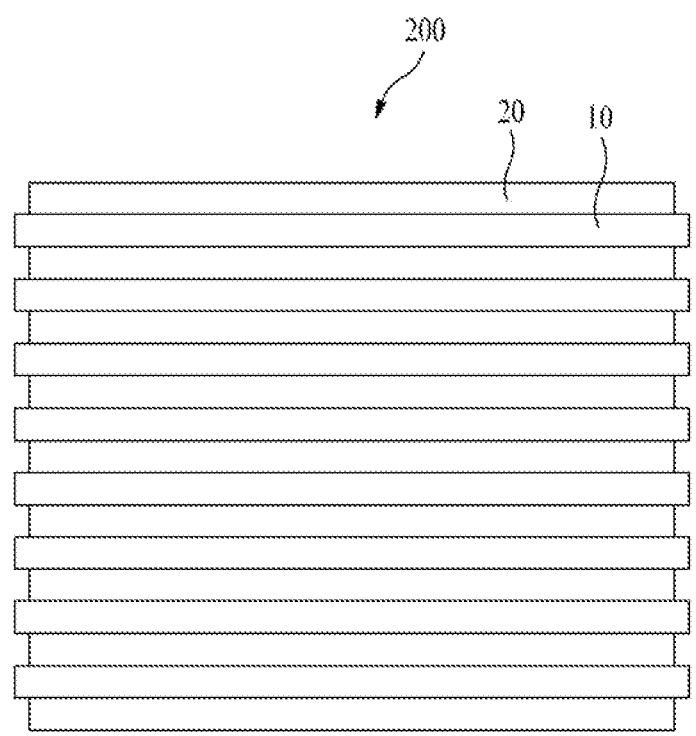
FIG. 6 is a cross sectional view taken along the line of B-B' of FIG. 5 showing the laminated core of the motor according to the second preferred embodiment of the present invention.

FIG. 5 is a partially enlarged perspective view of the laminated core of a motor according to a second preferred embodiment of the present invention, and FIG. 6 is a cross sectional view taken along the line of B-B' of FIG. 5 showing the laminated core of the motor according to the second preferred embodiment of the present invention.

Referring to FIGS. 5 and 6, the laminated core 200 according to the second preferred embodiment of the present invention includes a first core sheet 10 and a second core sheet 20 which are laminated by turns. The first core sheet 10 and the second core sheet 20 are the same as the first preferred embodiment, but in the second preferred embodiment, the thickness of the first core sheet 10 is equal to the thickness of the second core sheet 20. Except the above, detailed descriptions of the first core sheet 10 and the second core sheet 20 are the same as the first preferred embodiment.

As shown in FIGS. 5 and 6, the laminated core 200 according to the second preferred embodiment of the present invention is formed by the second core sheets 20 and the first core sheets 10 which are put on top of each other by turns from the bottom. Through such a laminated form, a contact surface area of the side part on which the insulating material is coated is increased so as to promote coating of the insulating material.

The core sheets which are respectively laminated at the lowermost part and the uppermost part of the laminated core 200 according to the second preferred embodiment are illustrated as the second core sheets 20 in FIGS. 5 and 6, but it is not restricted to the above and the first core sheets 10 may be laminated at the lowermost part and the uppermost part. In order to uniformly coat the insulating material at the edge portion, it is preferable that the second core sheets 20 be laminated at the lowermost part and the uppermost part. In this instance, as described in the first preferred embodiment of the present invention, at least two second core sheets may be laminated at the lowermost and uppermost parts.

Figure 7:
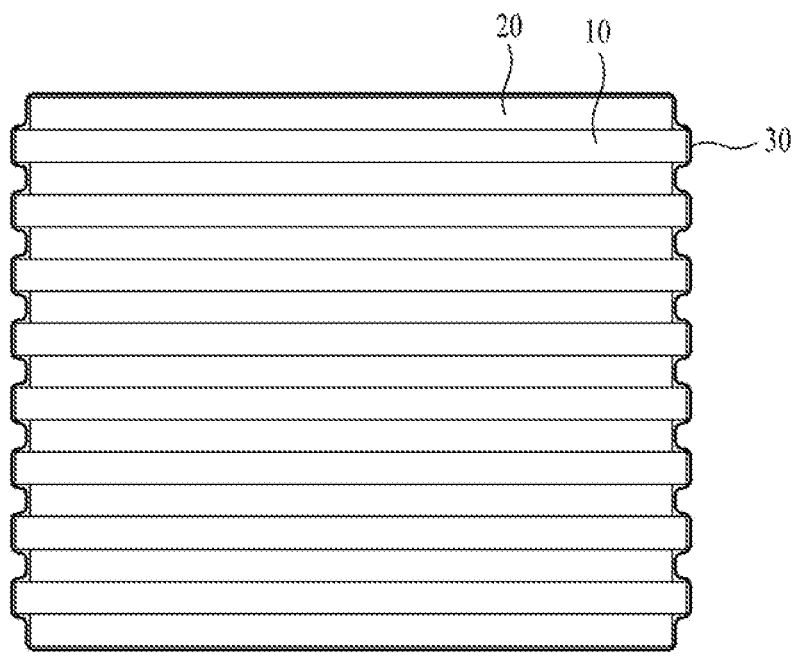
FIG. 7 is a sectional view showing a state where an insulating material is coated on the laminated core of the motor according to the second preferred embodiment of the present invention.

FIG. 7 is a sectional view showing a state where an insulating material is coated on the laminated core of the motor according to the second preferred embodiment of the present invention.

The insulating material 30 illustrated in FIG. 7 is the same as the first preferred embodiment. In case of the laminated core 200 according to the second preferred embodiment, a stepped portion formed at the side portion which will be coated is formed by a difference in size between the first core sheet 10 and the second core sheet 20, and it promotes coating of the insulating material 30 because a contact area of the insulating material 30 is increased due to the stepped portion.

Figure 8:
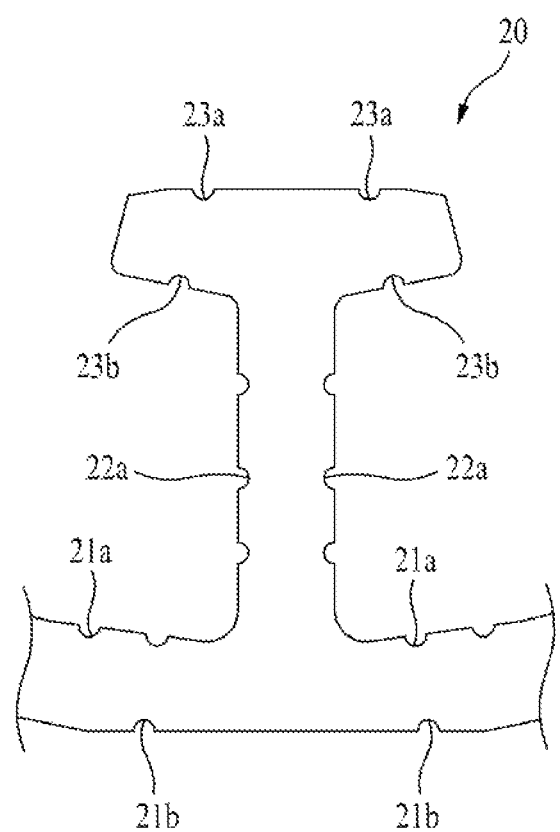
FIG. 8 is a plan view showing a state where various grooves are formed in a second core sheet used for the laminated core of the motor according to the embodiments of the present invention.

FIG. 8 is a plan view showing a state where various grooves are formed in a second core sheet used for the laminated core of the motor according to the embodiments of the present invention.

Referring to FIG. 8, one or more second core base inner grooves 21a are formed in the inner face of the second core base 21 of the second core sheet 20. One or more second core base outer grooves 21b are formed in the outer face of the second core base 21. Moreover, one or more second tooth side grooves 22a, preferably, a pair of second tooth side grooves 22a which are arranged symmetrically are formed at both sides of each of the second teeth 22. One or more second tooth ear inner grooves 23a are formed in the inner face of the second tooth ear 23 and one or more second tooth ear outer grooves 23b are formed in the outer face of the second tooth ear 23. The grooves 21a, 21b, 22a, 23a and 23b become paths which serve to promote coating of the insulating material and to increase adhesive power by increasing the surface area with which the insulating material gets in contact when it is hardened. The number and the positions of the grooves are illustrated in FIG. 8, but may be properly adjusted as occasion demands.

While the present invention has been described with reference to the particular illustrative embodiment, it is not to be restricted by the embodiment but only by the appended claims. It will be understood by those skilled in the art that simple modifications and changes of the embodiments within the scope of the present invention belong to the scope of the present invention.

What is claimed is:

1. A laminated core of a motor comprising:
   a first core sheet including a first rounded core base, a plurality of first teeth which are radially formed on the first core base, and first tooth ears formed at the end of each of the first teeth;
   a second core sheet including a second rounded core base, a plurality of second teeth which are radially formed on the second core base, and second tooth ears formed at the end of each of the second teeth, the second core sheet having the same shape as the first core sheet but being smaller than the first core sheet, wherein,
   each second tooth includes a plurality of second tooth side grooves, all of the second tooth side grooves arranged at both sides of each second tooth and symmetrically paired for insulation coating, and
   each second tooth ear includes one or more second tooth ear inner and outer grooves, said one or more second tooth ear inner and outer grooves respectively formed in the inner and outer face of the second tooth ear; and
   a stepped portion formed at a different sized portion between the first core sheet and the second core sheet, wherein an outer circumference of the first rounded core base is equal to an outer circumference of the second rounded core base, wherein the second core sheet is located at the lowermost part, one or more of the first core sheets are laminated on the second core sheet, and another second core sheet is located at the uppermost part.

2. The laminated core according to claim 1, wherein an insulating material is coated on the surface of the laminated core.

3. The laminated core according to claim 1, wherein a first tooth curved portion is formed at a portion where the first core base and the first tooth are connected with each other, and a second tooth curved portion is formed at a portion where the second core base and the second tooth are connected with each other.

4. The laminated core according to claim 1, wherein a first tooth ear curved portion is formed at a portion where the first tooth and the first tooth ear are connected with each other, and a second tooth ear curved portion is formed at a portion where the second tooth and the second tooth ear are connected with each other.

5. The laminated core according to claim 1, wherein one or more second core base inner grooves are formed in the inner face of the second core base and one or more second core base outer grooves are formed in the outer face of the second core base.

6. The laminated core according to claim 1, wherein the width of the first tooth ear is 1.1 times to 1.7 times larger than the width of the first tooth.

7. The laminated core according to claim 5, wherein each of the second tooth side groove, the second core base inner and outer grooves, and the second tooth ear inner and outer grooves increases coating of an insulating material.

8. A laminated core of a motor comprising:
a first core sheet including a first rounded core base, a plurality of first teeth which are radially formed on the first core base, each first tooth having the same shape to each other, and first tooth ears formed at the end of each of the first teeth, wherein the first rounded core base is elongated to form a first circle;
a second core sheet including a second rounded core base, a plurality of second teeth which are radially formed on the second core base, each second tooth having the same shape to each other, and second tooth ears formed at the end of each of the second teeth, the second core sheet having the same shape as the first core sheet but being smaller than the first core sheet, wherein the second rounded core base is elongated to form a second circle which corresponds to the first circle, wherein,
each second tooth includes a plurality of second tooth side grooves, all of the second tooth side grooves arranged at both sides of each second tooth and symmetrically paired for insulation coating, and
each second tooth ear includes one or more second tooth ear inner and outer grooves, said one or more second tooth ear inner and outer grooves respectively formed in the inner and outer face of the second tooth ear; and
a stepped portion formed at a different sized portion between the first core sheet and the second core sheet, wherein an outer circumference of the first rounded core base is equal to an outer circumference of the second rounded core base,
wherein the second core sheet is located at the lowermost part, one or more of the first core sheets are laminated on the second core sheet, and another second core sheet is located at the uppermost part.

* * * * *